Patented Aug. 25, 1936

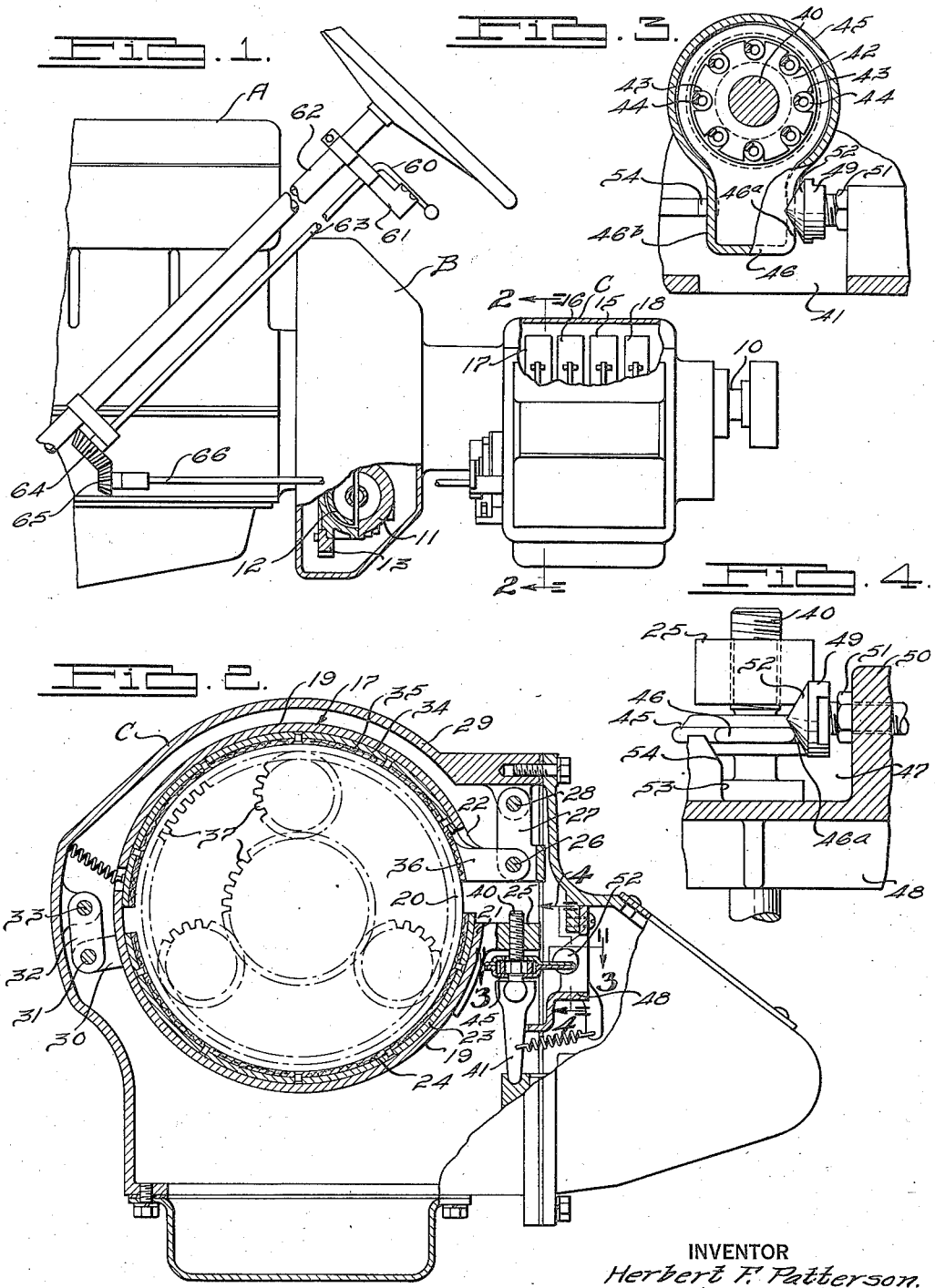

2,052,054

UNITED STATES PATENT OFFICE 2,052,054

BRAKING DEVICE

Herbert F. Patterson, Detroit, Mich., assignor to Chrysler Corporation, Highland Park, Mich., a corporation of Delaware Original application April 18, 1934, Serial No. 721,108. Divided and this application May 2, 1935, Serial No. 19,345. In Great Britain January 10, 1935

5 Claims. (Cl. 188—79.5)

This invention relates to power transmission devices and more particularly to an improved take-up mechanism for a braking system in power transmissions of the type including the well-known epicyclic or planetary transmission gear box, and is a division of my copending application Serial No. 721,108, filed April 18, 1934.

An object of the invention resides in the provision of improved means for automatically maintaining the desired amount of clearance between a rotary drum and the braking mechanism associated therewith, particularly in connection with a planetary type transmission although not necessarily limited thereto. My invention has particular significance in connection with a toggle brake applying mechanism disclosed in the aforesaid copending application. By maintaining the clearance within narrow limits I am able to maintain the proper braking action with a relatively small amount of travel in the brake actuating mechanism.

Further objects and advantages of the invention will be apparent from the following detailed description of an illustrative embodiment of the invention, reference being had to the accompanying drawing, in which:

Fig. 1 is a side elevational view illustrating my power transmission mechanism as a whole, portions of the transmission and clutch casings being broken away.

Fig. 2 is a sectional elevational view through the transmission and illustrating one of the planetary transmission speed ratio brake controlling devices, the section being taken along the line 2—2 of Fig. 1.

Fig. 3 is a plan view partly in cross section along the line 3—3 of Fig. 2 illustrating the clearance take-up device for the braking system.

Fig. 4 is a sectional elevational view taken along the line 4—4 of Fig. 2, also showing the clearance take-up device illustrated in Fig. 3.

Referring to the drawing, I have illustrated my invention in connection with a motor vehicle drive, this drive including a prime mover or engine A, a portion of which is shown in Fig. 1, a clutch B driven from the engine, and a change speed transmission or gear box C driven from the clutch B. The drive passes from the transmission through a power take-off shaft 10 which, as usual, may extend rearwardly of the vehicle to drive the usual rear ground wheels, not shown.

The clutch B in the present illustration is of the fluid type and has the usual driving and driven cooperating vane members 11 and 12 respectively. The driving vane member 11 is carried by the engine flywheel 13 and the driven vane member 12 is secured to a suitable power shaft, not shown.

The change speed transmission C is of the epicyclic or planetary type and includes a plurality of transmission speed ratio controlling clutches or brakes 15, 16, 17 and 18, these braking devices being respectively adapted to actuate the transmission in its first speed ratio or low gear, second speed ratio or intermediate gear, third speed ratio, and reverse drive.

The typical device illustrated in Fig. 2 consists of an outer band 19 which is somewhat flexible and which extends substantially circumferentially of a drum 20 so as to position the ends 21 and 22 thereof adjacent each other. This band 19 encloses a flexible segmental shoe 23 freely movable therewith, the segmental shoe preferably extending substantially half way around the drum 20 from the end 21 of the band, this segmental shoe having attached thereto a suitable friction braking material 24 for braking engagement with the drum 20. The end 21 of the band 19 is provided with a threaded actuating flange 25 and the end 22 is flanged to receive an anchor pin 26 carried by a link 27 pivotally supported at 28 to the housing 29 of the transmission C. The shoe 23 is anchored by a flange 30 pivoted at 31 with a link 32, the latter being pivotally supported at 33 with the aforesaid casing 29 of the transmission.

Located within the band 19 and also relatively movable therewithin, I have provided a second segmental flexible shoe 34 having attached thereto the brake lining material 35 engageable with the drum 20, the shoe 34 having one end thereof provided with an anchoring flange 36 engaged by the aforesaid pin 26. The other end of the substantially semi-circular shoe 34 lies within the band 19 and adjacent to the anchored end 40 of the first segmental shoe 23, as illustrated in Fig. 2.

The band 19 is contracted by forcing the flange 25 upwardly through pressure exerted on a threaded shaft 40, the upper end portion of which is in threaded engagement with the flange 25. The lower end of the shaft 40 has a ball portion which is received in the socket of an actuating finger 41. The mechanism for operating the finger 41 is more particularly described in my aforesaid copending application. The shaft 40 has the band clearance take-up device associated therewith, details of which are shown in Figs. 3 and 4.

One such take-up device is provided for each of the control brakes 15, 16, 17 and 18, and is preferably arranged in the line of pressure application between each of the individual selector elements, described in my aforesaid copending application, and a brake controlling device.

The threaded shaft 40, at a portion thereof intermediate the ball end and the flange 25 of the band 19, is provided with an integral hub 42 having a circumferential series of axially extending openings 43 adapted to closely receive the respective coil springs 44. Surrounding the periphery of the hub 42 and also housing the springs 44 is an adjusting casing 45 provided with an outwardly extending lever arm 46. This lever arm projects into an opening 47 of a bracket 48 secured to the transmission casing 29, and arranged in the path of movement of the lever 46 for adjustable contact with one edge 46a thereof is an adjustable abutment 49 threadedly engaging the portion 50 of the bracket 48, the abutment 49 being secured in its position of adjustment by a lock nut 51. The abutment member 49 has a conical guide face 52 which acts as a cam guide for the edge 46a of the lever 46. The opposite edge 46b of the lever 46 is guided during its upward movement by the side 53 of the opening 47, the side or guide 53 extending upwardly and then laterally by a portion 54 which is parallel with the line of contact between the side 46a and the conical cam face 52 of the abutment member 49.

The operation of the take-up mechanism is as follows: When the band 19 is in its normally retracted position there is a predetermined clearance between the drum and shoes. When it is desired to apply the braking device to the drum of a particular controlling device as illustrated in Fig. 2, the selector mechanism disclosed in my aforesaid copending application acts on the finger 41 moving it upwardly, the hub 42 also being carried upwardly in contracting the band 19. In the event that excessive clearance develops beyond a predetermined amount which is initially set to best accommodate movement of the selector mechanism supra, it will be apparent that in such event the finger 41 will have a somewhat greater upward movement than will normally occur thereby causing the lever 46 to be moved along the cam face 52 while the shaft 40 is being moved near the upper limit of its travel in applying the braking device 17. In Fig. 4 I have illustrated this condition, it being apparent that the lever 46 will be moved to the left as viewed in Fig. 4, such movement being accommodated by the inclined side 54 which is thereby vertically overhung by the side 46b of the lever 46.

When the lever 46 is shifted during the brake applying movement of the shaft 40, the pressure exerted by the selector mechanism and the flange 25 will be sufficient to prevent rotation of the shaft 40 under the influence of the friction established by the springs 44 acting on the lever housing 45. Thus, this shifting movement of the lever 46 causes the housing 45 to be slightly rotated an amount corresponding to the shifting of the lever 46, the housing 45 slipping on the ends of the springs 44.

When the selector mechanism is released and the pressure on the shaft 40 is thereby relieved, the band 19 expands and the flange 25 moved downwardly so as to cause the edge of the side 46b of the lever 46 to contact with the inclined side 54 and thereby shift the lever 46 to the right as viewed in Fig. 4 back to its original position prior to contacting with the cam face 52 on the upward movement of the lever. When this return movement of the lever 46 takes place, the friction established by the springs 44 is sufficient in the absence of pressure on the finger 41 to rotate the housing 45 and hub 42 as a unit, the direction of the threads of the shaft 40 causing the shaft to move downwardly relative to the flange 25. The effect of this adjustment is to bring the finger 41 closer to the actuating part of the selector mechanism so that the next time the same is actuated the braking device 17 will be actuated earlier in the upward movement of the shaft 40 than before. Furthermore, after the clearance has been taken up in this manner, the lever 46 merely engages the cam face 52 but does not move upwardly sufficiently to cause a shifting movement of the lever 46 until such time as the brake linings 24 and 35 become sufficiently worn to develop further clearance, in which case the clearance is taken up as described before.

It will be understood that the illustration in Fig. 4 is somewhat exaggerated since ordinarily the clearance will be taken up in very small increments as it develops during operation of the braking device 17. It will be apparent that the friction connection between the housing 45 and the hub 42 is in the nature of a friction ratchet-like mechanism, these parts relatively slipping during the brake applying action whenever clearance is to be taken up, and being frictionally connected together so as to rotate as a unit during the brake releasing action.

It will furthermore be noted that by reason of my having provided a separate clearance take-up mechanism associated with each of the speed ratio brake controlling devices, I am able to maintain the desired amount of clearance for each braking device independently of each other according to the usage of the mechanism and the amount of wear which might be experienced in one or more of the brake controlling devices more than in others.

The manually controlled selector mechanism for the transmission C is particularly described in my aforesaid copending application, and is controlled by a manual selector arm 60 cooperating with a notched segment 61 mounted on the steering post column 62. The arm 60 has a shaft 63 extending downwardly along the column 62, the lower end of the shaft having fixed thereto a bevel gear 64 meshing with a gear 65 attached to a rearwardly extending rod 66 cooperating with the transmission C.

Various changes, including the size, shape and arrangement of parts, may be made without departing from the spirit of my invention, and it is not my intention to limit its scope other than by the terms of the appended claims.

What I claim is:

1. A take-up device of the class described comprising, relatively movable members adapted to respectively receive and transmit a braking thrust, said members having a normal predetermined path of unitary movement in response to application of said braking thrust, a slipping clutch associated with at least one of said members, and an adjustable abutment having cam means for actuating said clutch in response to abnormal movement of said members for relatively moving said members.

2. A take-up device of the class described comprising, threadedly connected members adapted to respectively receive and transmit a braking thrust, said members having a normal predetermined path of unitary movement in response to application of said braking thrust, a slipping clutch associated with at least one of said members, and means including an adjustable abutment having a cam face for actuating said clutch in response to abnormal movement of said members for relatively moving said members.

3. A take-up device of the class described comprising, relatively movable members adapted to respectively receive and transmit a braking thrust, said members having a normal predetermined path of unitary movement in response to application of said braking thrust, a slipping clutch associated with at least one of said members and comprising a hub movable therewith, a casing, a frictional connection between said casing and hub, and cam means for moving said casing relative to said hub in response to abnormal movement of said members during application of said braking thrust.

4. In a brake having a drum and brake shoe means frictionally engageable therewith, said brake shoe means having a predetermined clearance with said drum when said brake is inoperative, means for actuating said brake shoe means into frictional engagement with said drum, said actuating means including a pair of relatively movable elements, slipping clutch means associated with one of said elements and including a hub member, a casing member for said hub, a plurality of springs carried by one of said members and frictionally engaging the other, an arm on said casing, and cam means engageable with said arm on abnormal movement of said actuating means for relatively adjusting said elements to maintain said predetermined clearance.

5. In a braking device including a casing therefor, a rotary element, brake shoe means having a predetermined clearance with said rotary element and adapted for actuation into braking engagement therewith, said brake shoe means having a radially extending flange member, means for actuating said brake shoe means, and means responsive to abnormal actuation of said brake shoe means for taking up clearance in excess of said predetermined clearance, said take-up means including a member in threaded engagement with said flange member, cam means carried by said casing, and slipping clutch means actuated by said cam means for rotating one of said members relative to the other.

HERBERT F. PATTERSON.